Figure 1:
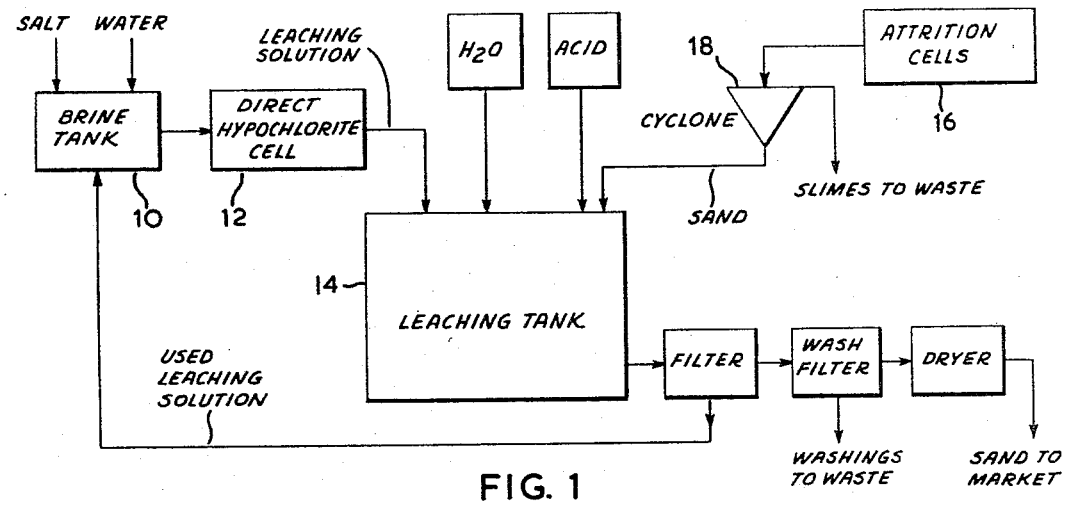

Jan. 10, 1967 P. A. CHUBB 3,297,402
TREATMENT OF SAND AND OTHER INDUSTRIAL MINERALS
Filed June 24, 1964

INVENTOR.
PHILIP A. CHUBB
BY~ *Hetherstonhaugh & Co.*

ATTORNEYS

United States Patent Office 3,297,402
Patented Jan. 10, 1967

3,297,402
TREATMENT OF SAND AND OTHER
INDUSTRIAL MINERALS
Philip A. Chubb, 100 Adelaide St. W., Suite 1010,
Toronto, Ontario, Canada
Filed June 24, 1964, Ser. No. 377,679
Claims priority, application Great Britain, July 20, 1963,
28,811/63
8 Claims. (Cl. 23—182)

This invention relates to the treatment of sand and other industrial minerals in order to reduce the iron content thereof, particularly iron sulphides.

Many silica sands and other industrial minerals are contaminated by minute iron bearing sulphides, for example, pyrite, attached to the surface of the mineral. The presence of this iron reduces the value of the industrial mineral, and in the case of sand used for making glass, it imparts a colour to the glass even when present in very small quantities.

There have been many prior proposals for removing or reducing the amount of iron to tolerable levels. These processes include roasting, attrition scrubbing, gravity separation, flotation or leaching with common acids, or various combinations of these treatments. Some of the acids employed have been hydrochloric, sulphuric, hydrofluoric and fluosilic. Some of these earlier processes are still in common use and are effective to varying degrees. Others of these processes are either ineffective or too expensive. For example, processes involving hydrofluoric acids are expensive due to the cost of the acid itself, and due to the high cost resulting from the fact that hydrofluoric acid is difficult to handle. Also, the known processes involving leaching with common acids are not effective against iron sulphide contaminates. For example, pyrite is usually considered to be very inert to common acids, being soluble only in concentrated nitric acid. The most common prior method of removing pyrite has been to roast the mineral containing the pyrite at temperatures between 900 and 1100° F. and subsequently dissolving the resulting iron compound in acid solutions. The application of heat to accomplish the roasting makes this process expensive.

It is, therefore, an object of this invention to reduce iron sulphide contaminates in industrial minerals by a more effective and economical process than has heretofore been available.

It is a more specific object of the invention to reduce iron sulphide contaminates contained in industrial minerals, particularly sand and kaolin, by leaching the mineral with a hypochlorite.

While the process in accord with the invention is particularly adapted to the removal of the iron content from silica sands and kaolin, it may also be used to good advantage in the treatment of other industrial minerals, such as feldspar, calcite, dolomite, magnesite, fluorspar, cryolite, and nepheline syenite. Accordingly, although the following specification refers particularly to the treatment of silica sand and kaolin, it will be appreciated that the process may be equally adaptable to the treatment of other industrial minerals.

It has been found that treatment of silica sand by the process in accord with the invention considerably improves the colour (whiteness) of the sand, or of the pulverized products therefrom, so that they more readily meet the rigid colour specifications of various consuming industries.

The invention will be more thoroughly understood from the following description of the preferred embodiments thereof as read in conjunction with the accompanying drawing.

Figure 2:
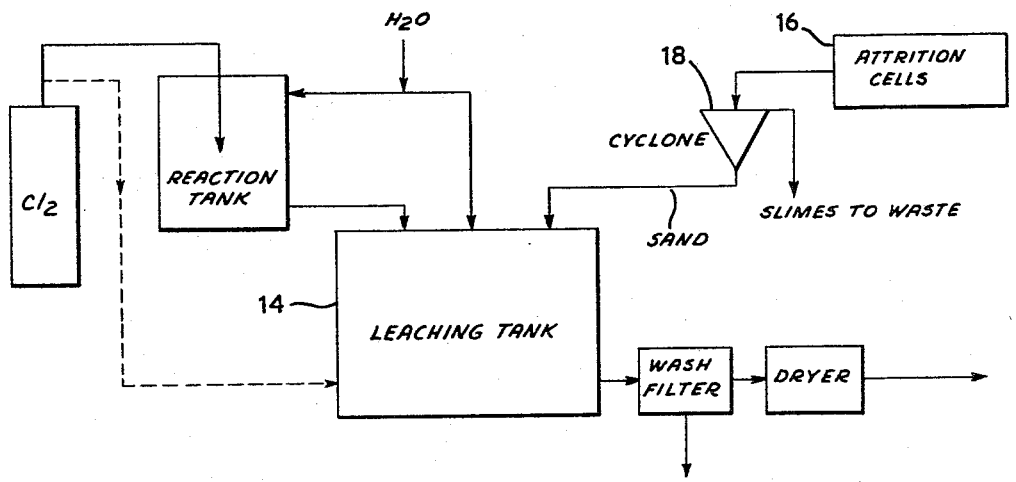

In the drawings:

FIGURE 1 is a flow sheet of a first preferred embodiment of the process in accord with the invention for reducing the iron content of a silica sand by leaching with sodium hypochlorite; and FIGURE 2 is a flow sheet of a second preferred embodiment of the invention.

As prevously mentioned, the invention may be defined broadly as leaching an industrial mineral with a hypochlorite. Suitable hypochlorites are hydrogen hypochlorite (hypochlorous acid) produced by the reaction of chlorine and water, $Cl_2+H_2O \rightarrow HOCl+HCl$; calcium hypochlorite produced by the reaction of chlorine gas on a solution of hydrated lime $[Ca(OH)_2]$ or quick lime, CaO, e.g., $Cl_2+Ca(OH)_2 \rightarrow CaOCl_2+H_2O$; sodium hypochlorite or potassium hypochlorite produced by the reaction of chlorine gas on a solution of sodium hydroxide or potassium hydroxide, e.g., $$2NaOH+Cl_2 \rightarrow NaOCl+NaCl+H_2O$$
$$2KOH+Cl_2 \rightarrow KOCl+KCl+H_2O$$

The sodium and potassium hypochlorites may also be produced by electrolysis of the respective brine solutions, e.g., $2NaCl+2H_2O+\text{electric current} \rightarrow 2NaOH+Cl2+H_2$ followed by separation and collection of the products and by the reaction mentioned above, $$2NaOH+Cl_2 \rightarrow NaOCl+NaCl+H_2O$$

These indirect methods of producing hypochlorites are generally well known commercial processes, and are carried out in a diaphragm or mercury cell. The direct production of sodium hypochlorite by electrolysis of a brine solution in a direct electrolytic cell is also possible and produces a weak hypochlorite solution (1–2% available chlorine) but this usually is of sufficient strength for the leaching process. It has the advantage that low purity salt (rock salt) is used and spent leaching solution (brine) may be recycled to the electrolytic cell. Further, in certain areas sodium hypochlorite may be purchased directly from producers of certain chemicals which are manufactured by processes giving sodium hypochlorite as a by-product.

It has been found that the hypochlorites mentioned above react slowly with pyrite, etc., at normal ambient temperatures. These leaching compounds (hypochlorites) are unstable and disintegrate, giving up atomic oxygen, which is extremely active and oxidizes the sulphides, e.g., $NaOCl \rightarrow NaCl+O$.

The disintegration rate of the hypochlorites can be increased or controlled by various methods or combinations of methods, e.g., by elevation of temperature, by radiation by sunlight or by the addition of an acid, i.e. hydrochloric or sulphuric, or an acid forming substance, e.g., $CO_2$.

When the leaching solutions are alkaline, i.e. contain excess hydroxide, the reaction with the pyrite or other iron sulphide produces iron hydroxide or oxide and a final acid wash is required. Completeness of the reaction between the leach solution and the iron sulphide is dependent upon particle size of the sulphides. With extremely fine sulphides, the oxidation is more or less complete, while with coarse particles, a coating of the reaction compound forms on the sulphide and slows down further reaction by sealing off the sulphides. Accordingly, an acidified hypochlorite leach is preferable since the iron compound formed is taken into solution by the excess acid. It is usually advantageous to remove coarse sulphides by other metallurigical processes, i.e. gravity tables, flotation, Humphrey's spirals, etc., prior to leaching.

As stated above, in view of the above noted difficulties resulting from the presence of excess hydroxide, the process in accord with the invention is preferably carried out with an acidified hypochlorite. The iron is taken into solution through the formation of water soluble iron compounds and acidification is preferably affected by adding HCl, in which case water soluble iron chloride is formed or sulphuric acid which produces water soluble iron sulphate. The use of a leach solution as acid pH is preferable for other reasons as well. For example, other unwanted acid soluble minerals will be reduced during the leaching process.

As indicated above, the degree of iron sulphide leaching is a function of several variables including leach solution strength, temperature, pH, time and size of iron sulphide particles. A proper balance of these variables for maximum iron reduction must be determined for each product being beneficiated.

In leaching acid soluble minerals such as calcite and dolomite, an alkaline hypochlorite leach is usually essential followed by a weak acid wash. Leaching with a solution at acid pH would, of course, destroy the mineral itself. In cases where iron oxide is present on mineral surfaces, particularly when the iron sulphide surfaces are oxidized or otherwise coated, it may be necessary to pre-condition the mineral prior to leaching by vigorous attrition scrubbing, acid leaching, or both.

Two examples of the process in accord with the invention are shown in FIGS. 1 and 2. In accord with the flow sheet of FIG. 1, the hypochlorite is sodium hypochlorite produced by a direct hypochlorite cell. Salt, which may be common rock salt, and water are fed to a brine tank 10 for mixing, with the resultant brine being passed to the hypochlorite cell 12. The leach solution produced in the cell has available chlorine in the order of 1–2% and is fed to a leaching tank 14, together with water as to dilute it to the desired strength normally below 1% and sufficient HCl to maintain the leach solution at an acid pH. The sand is preferably pre-conditioned by being passed through attrition cells 16 to remove iron oxides, particularly iron oxides formed on the surfaces of the iron sulphides to be leached. Following attrition scrubbing the sand is preferably passed through a cyclone 18 with slimes going to waste.

The leaching within tank 14 is controlled by various means which are determined by the nature of the sand or other industrial mineral being treated. Various examples of these controlling steps are described in the further examples recited hereinafter.

The process in accord with FIG. 1 is essentially a batch process and in order to ensure fresh solution at the sulphide surfaces, it may be advantageous to affect slow circulation of solution within the tank. Upon completion of the leaching step, the spent leaching solution which will be chiefly brine is filtered from the mineral with the latter subsequently being water washed and dried, with the washings going to waste.

The embodiment of the precess shown in the flow sheet in accord with FIG. 2 primarily differs from the FIG. 1 embodiment in that hydrogen hypochlorite (hypochlorous acid) is the leach solution. The hypochlorous acid may be produced in a separate reaction tank or the chlorine gas may be introduced directly into the water-sand mixture in the leaching tank. In using hypochlorous acid it is not necessary to recover the leach solution which goes to waste.

As mentioned above, the leaching is controlled by various factors. As the leaching essentially consists of oxidation of the sulphides and the oxygen provided for this purpose stems from the disintegration of the hypochlorite, the control of the leaching essentially consists of controlling the rate of disintegration of the hypochlorite. As previously mentioned, this disintegration of the hypochlorite can be controlled by temperature, radiation by sunlight, by the addition of an acid or acid forming substance, or by a combination of any of the above. It should be appreciated, however, that one of the chief advantages of the method of decreasing iron sulphide contaminates in an industrial mineral in accord with this invention is that the method can be carried out at low temperature. Thus, should the temperature of available water be fairly low, the method is still effective even though it may take some time to effect full disintegration of the hypochlorite, particularly non-acidified hypochlorite. At low water temperatures, and using non-acidified hypochlorite, it may require some time to effect the leaching. Nevertheless, the leaching will be accomplished and it might well be that in certain cases, a process might be more economically carried out at the ambient temperature of the available water so as to avoid the expense involved in heating same. On the other hand, should heat be readily available at relatively low cost, it might be more economic to use this available heat to raise the temperature within the leach tank as to increase the rate of disintegration of the hypochlorite, in which case the leaching could be carried out within relatively short periods of time, even minutes. In other cases, where only water at low temperature is available and fast leaching is considered desirable without having to heat the water, disintegration of the hypochlorite can be increased by increasing acidity.

To illustrate the effect of varying the several controlling factors and/or the particular hypochlorite used, the following further examples are presented. In each of the examples a silica sand containing by analysis 0.04% $Fe_2O_3$ was leached. The strength of a hypochlorite solution is expressed in terms of "available chlorine" which is the weight of the chlorine chemically equivalent to the nascent oxygen.

*Example I*

200 gms. of silica sand were leached for 18 hours at 70° F. with 54 cc. of sodium hypochlorite solution containing 0.38% available chlorine, acidified to a pH of 1.3. The iron content of the sand was reduced by 39%.

*Example II*

200 gms. of silica sand were leached for 24 hours at 60° F. with 55 cc. of potassium hypochlorite solution containing 0.3% available chlorine, acidified to a pH of 1.3. The iron content of the sand was reduced by 20%.

*Example III*

200 gms. of silica sand were leached for 24 hours at 60° F. with 56.5 cc. of calcium hypochlorite solution containing 0.3% available chlorine, acidified to a pH of 1.3. The iron content of the sand was reduced by 24%.

*Example IV*

200 gms. of silica sand were leached for 24 hours at 55° F. with 48 cc. of hydrogen hypochlorite solution (hypochlorous acid) containing 0.8% chlorine. The iron content of the sand was reduced by 27%.

*Example V*

200 gms. of silica sand were leached for 1 hour at 75° F. in 54 cc. of sodium hypochlorite solution containing 0.38% available chlorine, acidified to a pH of 2.4. The iron content of the sand was reduced by 10%.

*Example VI*

200 gms. of silica sand were leached for 18 hours at 75° F. in 54 cc. of sodium hypochlorite solution containing 0.38% available chlorine, acidified to a pH of 2.4. The iron content of the sand was reduced by 40.7%.

*Example VII*

200 gms. of silica sand were leached for 18 hours at 45° F. with 54 cc. of sodium hypochlorite solution containing 0.38% available chlorine, acidified to a pH of 2.4. The iron content of the sand was reduced by 23.9%.

*Example VIII*

200 gms. of silica sand were leached for 24 hours at 50° F. with 54 cc. of sodium hypochlorite solution containing 0.38% available chlorine, acidified to a pH of 2.1. The iron content of the sand was reduced by 37.2%.

*Example IX*

200 gms. of silica sand were leached for 24 hours at 50° F. with 56 cc. of sodium hypochlorite solution containing 0.55% available chlorine, acidified to a pH of 2.1. The iron content of the sand was reduced by 48.8%.

As can be appreciated from the above examples, it is possible to achieve at least some reduction in the iron sulphide contaminates in sand by leaching with a hypochlorite under a wide variety of leaching conditions. Generally speaking, however, it is found that an economic process can be carried out by leaching with sodium hypochlorite having a pH of from 1 to 3, available chlorine of less than 1% and a temperature of from 45 to 70° F. for a period of time from 18 to 24 hours. This is not to say that an economic process is not possible using one of the other hypochlorites mentioned or using sodium hypochlorite under leaching conditions which do not fall within the ranges suggested. Other variations in the leaching conditions might be advantageous in leaching other types of sand or industrial minerals.

What I claim as my invention is:

1. A method of decreasing the quantity of iron sulphide contaminates in silica sand which comprises the step of leaching the sand with a hypochlorite selected from the group consisting of hydrogen hypochlorite, sodium hypochlorite, potassium hypochlorite and calcium hypochlorite.

2. A method of decreasing the quantity of iron sulphide contaminates in silica sand which comprises the step of leaching the sand with a hypochlorite solution having an acid pH, with the hypochlorite being selected from the class consisting of hydrogen hypochlorite, sodium hypochlorite, potassium hypochlorite and calcium hypochlorite.

3. A method of decreasing the quantity of iron sulphide contaminates in silica sand which comprises the step of leaching the sand with a hypochlorite solution having an alkaline pH, with the hypochlorite being selected from the class consisting of hydrogen hypochlorite, sodium hypochlorite, potassium hypochlorite and calcium hypochlorite and acid washing the leached mineral.

4. A method of decreasing the quantity of iron sulphide contaminates in silica sand which comprises the step of leaching the sand with an acidified sodium hypochlorite solution containing less than 1% available chlorine.

5. A method of decreasing the quantity of iron sulphide contaminates in silica sand which comprises the step of leaching the sand with a sodium hypochlorite solution having a pH of from 1 to 3.

6. A method of decreasing the quantity of iron sulphide contaminates in silica sand which comprises the step of leaching the sand with a sodium hypochlorite solution having a pH of from 1 to 3 and available chlorine of less than 1%.

7. A method of decreasing the quantity of iron sulphide contaminates in silica sand which comprises the step of leaching the sand with a sodium hypochlorite solution having a pH of from 1 to 3, an available chlorine content of less than 1% and a temperature of from 45 to 75° F. for a period of time of 18 to 24 hours.

8. A method of decreasing the quantity of iron sulphide contaminates in silica sand which comprises the step of leaching the sand with a sodium hypochlorite solution having a pH of about 2, an available chlorine content of about 0.5% and a temperature of about 50° F. for approximately 24 hours.

References Cited by the Examiner
UNITED STATES PATENTS 1,918,735   7/1933   Bradley et al. _____ 23—182

OSCAR R. VERTIZ, *Primary Examiner.*

A. J. GREIF, *Assistant Examiner.*